(12) United States Patent
Loni

(10) Patent No.: US 6,882,783 B2
(45) Date of Patent: Apr. 19, 2005

(54) METHOD AND APPARATUS FOR THE ALIGNMENT OF OPTICAL COMPONENTS

(75) Inventor: Armando Loni, Malvern (GB)

(73) Assignee: QinetiQ Limited, Hants (GB)

( * ) Notice: Subject to any disclaimer, the term of this patent is extended or adjusted under 35 U.S.C. 154(b) by 254 days.

(21) Appl. No.: 10/359,563

(22) Filed: Feb. 7, 2003

(65) Prior Publication Data

US 2004/0017979 A1 Jan. 29, 2004

(30) Foreign Application Priority Data

Feb. 7, 2002 (GB) .............................................. 0202847

(51) Int. Cl.[7] .................................................. G02B 6/26
(52) U.S. Cl. ......................................... 385/52; 385/49
(58) Field of Search ............................. 385/52, 51, 49, 385/14, 88, 90, 50, 31

(56) References Cited

U.S. PATENT DOCUMENTS

| | | | | |
|---|---|---|---|---|
| 4,772,086 A | * | 9/1988 | Bellerby et al. .............. | 385/49 |
| 5,073,002 A | * | 12/1991 | Hockaday .................... | 385/49 |
| 5,465,312 A | * | 11/1995 | Maxwell et al. .............. | 385/49 |
| 5,999,670 A | * | 12/1999 | Yoshimura et al. ........... | 385/14 |
| 6,270,261 B1 | * | 8/2001 | Kawano ....................... | 385/88 |
| 2003/0215187 A1 | * | 11/2003 | Tidmarsh et al. ............. | 385/49 |

* cited by examiner

Primary Examiner—Frank G. Font
Assistant Examiner—James P. Hughes
(74) Attorney, Agent, or Firm—Nixon & Vanderhye P.C.

(57) ABSTRACT

An apparatus for facilitating the alignment of an optical fiber to an integrated waveguide component comprising a substrate having an integral waveguide comprises a mask arranged to be disposed between the optical fiber and the integrated waveguide component, wherein the mask includes an aperture extending therethrough. In use, the aperture is substantially exactly aligned with the waveguide thereby to permit light from the optical fiber to be transmitted to the waveguide but to substantially prevent light from the optical fiber from passing around the waveguide and/or through the substrate.

21 Claims, 1 Drawing Sheet

METHOD AND APPARATUS FOR THE ALIGNMENT OF OPTICAL COMPONENTS

BACKGROUND OF THE INVENTION

1. Field of the Invention

The present invention relates to a method and apparatus for the alignment of optical components and particularly, but not exclusively, for the alignment of an optical fibre to an integrated optical component. The invention finds particular application in the alignment of an optical fibre with an integrated waveguide component comprising a substrate having an integral waveguide or further optical elements located in or on the substrate. Optical arrangements comprising optical fibres and integrated waveguide components are common in, for example, optical modulators for high-speed telecommunications.

2. Discussion of Prior Art

When mounting an optical element such as an optical fibre to an optical waveguide, and particularly to an integrated waveguide component (hereafter referred to as an IWC) comprising a substrate having an integral waveguide, it is necessary to substantially exactly align the optical fibre with the waveguide so as to minimise signal loss between the optical fibre and the waveguide.

There are currently two main techniques used by manufacturers to align optical fibres with IWCs. The first known method involves manually manipulating the optical fibre and a coupling lens arrangement until light from the optical fibre is focussed by the lens arrangement onto the input face or facet of the IWC.

The second known method involves manually aligning and butting the optical fibre to the input facet of the IWC.

In the above methods, an optical detector is placed at the output facet of the IWC to image or monitor the light passing through the waveguide. A particular waveguide "mode" signal is produced when the optical fibre is substantially exactly aligned with the waveguide and it is this mode signal which the detector is arranged to detect. When the optical fibre is substantially exactly aligned with the waveguide in the IWC, the waveguide is excited and the mode signal is produced. The optical fibre is then fixed in place relative to the IWC by any appropriate means.

Both of the aforementioned methods do, however, exhibit considerable disadvantages. Firstly, since the waveguide is relatively narrow, it takes a considerable time to manually manipulate the optical fibre to a position where the waveguide mode is excited and the waveguide mode signal is produced. Secondly, because the light from the optical fibre is diffracted as it emerges from the end of the fibre, some of the light can scatter into the substrate of the IWC and is thus transmitted through the substrate (i.e. not through the waveguide proper). This diffracted light is also received by the detector and interferes with the mode signal produced by the waveguide, significantly hindering the detector's ability to detect the mode signal. As a result, a relatively long time can be required to align the optical fibre with the waveguide, typically approaching one hour, using these processes. Moreover, the process generally requires manual manipulation and cannot be achieved with any significant degree of automation.

An alternative technique for minimising signal loss when coupling an optical signal between an optical element, such as an optical fibre, and an optical waveguide is described in GB 2,368,658. GB 2,368,658 utilises an optical taper located between the optical element and the optical waveguide to funnel light there-between. Consequently, the optical element and the optical waveguide do not need to be precisely aligned to achieve efficient coupling of an optical signal between the two optical elements. Thus, the inclusion of the optical taper has the effect of relaxing the tolerance required for aligning the optical element and the optical waveguide.

Whilst the technique described in GB 2,368,658 may allow signal losses to be minimised, the technique may not be applicable to applications requiring single mode excitation in the waveguide. The optical taper potentially disrupts the collection angle of the waveguide, resulting in multi-mode excitation within the waveguide rather than single mode excitation.

It would be advantageous to provide an improved method and apparatus for facilitating the alignment of the optical fibre with the waveguide, which alleviates the aforementioned difficulties and permits a degree of automation to be involved. It is an aim of the present invention to provide such a method and apparatus.

SUMMARY OF THE INVENTION

According to a first aspect of the present invention, therefore, there is provided an apparatus for facilitating the alignment of an optical fibre, said optical fibre adapted to convey a beam of tight there-within, with an integrated waveguide component comprising a substrate having an integral waveguide, the apparatus comprising:

a mask arranged to be disposed between the optical fibre and the integrated waveguide component, the mask comprising a body including an aperture extending therethrough; wherein the body of the mask is substantially non-transmissive and non-reflective of light incident thereon from the optical fibre and wherein, in use, the aperture is substantially exactly aligned with the waveguide thereby to permit light from the optical fibre to be transmitted through the aperture to the waveguide but to substantially prevent light from the optical fibre from passing around the waveguide and/or through the substrate.

The apparatus is advantageous in that diffracted light emerging from the end of the fibre is prohibited from scattering into the substrate of the integrated waveguide component and prevented from passing around the waveguide. The apparatus reduces the amount of stray light reaching the detector at the output facet of the integrated waveguide component, thereby improving the detector's ability to detect the mode signal in the waveguide.

The mask may have a cross-sectional area greater than or equal to the cross-sectional area of the integrated waveguide component.

Conveniently, the aperture may be sized to correspond substantially to the cross-sectional area of the waveguide. However, the aperture may taper such that the cross-sectional area thereof reduces from a front surface of the mask to a rear surface thereof, such that the cross-sectional area at the rear surface is substantially equal to the cross-sectional area of the waveguide.

The cross-sectional area of the aperture at a front surface of the mask may be approximately 25 $\mu m^2$ and the cross-sectional area of the aperture at a rear surface of the mask may be approximately 15 $\mu m^2$. The aperture may have an aspect ratio of approximately 1.7:1. Alternatively, the aperture may have a constant cross-sectional area.

The mask may comprise a block of a semi-conductor material. Preferably, the semiconductor material is silicon. The mask may thus be formed from a silicon wafer.

Advantageously, the silicon is doped, coated or otherwise treated, thereby to render it substantially non-transparent to incident light from the optical fibre.

The apparatus may further include an alignment device for further facilitating alignment of the optical fibre with the aperture.

The alignment device may conveniently comprise a plurality of reflective strips disposed on the front surface of the mask. The reflective strips may, for example, take the form of a barcode for reflecting light from the optical fibre.

The apparatus may still further comprise a detector for detecting light reflected by one or more of the reflective strips and generating a first signal in response thereto.

The apparatus may yet further comprise a processor for receiving the first signal, determining the position of the optical fibre relative to the aperture and generating a control signal in dependence thereon. The apparatus may additionally comprise an actuator for manipulating the optical fibre in dependence on the control signal, thereby to align the optical fibre with the aperture.

Alternatively, the alignment device may comprise a plurality of detector elements disposed on the front surface of the mask, each detector element being arranged to detect light from the optical fibre and generate a signal in dependence upon the amount of light detected. The apparatus may further comprise a processor for receiving the signal generated by each detector element, determining the position of the optical fibre relative to the aperture and generating a control signal in response thereto.

Alternatively, the alignment device may comprise a track or tracks disposed on the front surface of the mask. The track or tracks may advantageously act to guide the fibre to the aperture.

The apparatus may still further comprising an actuator for manipulating the optical fibre in dependence on the control signal, thereby to align the optical fibre with the aperture.

According to a second aspect of the invention there is provided a method of aligning an optical fibre to an integrated waveguide component comprising a substrate having an integral waveguide, the method comprising:
(a) positioning a mask adjacent an input facet of the integrated waveguide component, the mask having an aperture extending therethrough;
(b) aligning the aperture substantially exactly with the waveguide in the integrated waveguide component;
(c) manipulating the optical fibre so that light transmitted therefrom is incident upon the mask;
(d) detecting light emitted from an output facet of the integrated waveguide component;
(e) further manipulating the optical fibre until it attains a desired position, whereby a waveguide mode signal is detected at the output facet of the integrated waveguide component; and
(f) fixing or securing the optical fibre relative to the integrated waveguide component in said desired position.

The method is advantageous in that diffracted light emerging from the end of the fibre is prohibited from scattering into the substrate of the integrated waveguide component and prevented from passing around the waveguide. The method reduces the amount of stray light reaching the detector at the output facet of the integrated waveguide component, thereby improving the detector's ability to detect the mode signal in the waveguide (and hence determine when the desired position of the optical fibre has been attained).

According to a further aspect of the invention there is provided an optical arrangement comprising an integrated waveguide component, an optical fibre secured in a fixed position relative to the integrated waveguide component, and a mask comprising a body having an aperture extending therethrough, the mask being disposed between the integrated waveguide component and the optical fibre, wherein the body of the mask is substantially non-transmissive and non-reflective of light incident thereon from the optical fibre, and wherein the aperture is substantially exactly aligned with the waveguide, thereby to permit light from the optical fibre to be transmitted through the aperture to the waveguide but to substantially prevent light from the optical fibre from passing around at least one of the waveguide and the substrate, or through the substrate.

In the foregoing description, where the mask comprises a block of silicon, the apparatus for facilitating the alignment of an optical fibre to an integrated waveguide component may be manufactured using the following method:
(a) providing a silicon wafer having a predetermined thickness;
(b) photolithographically etching the silicon wafer to define a plurality of mask units;
(c) dry etching an aperture through each of the mask units; and
(d) cutting or dicing the silicon wafer into a plurality of blocks, each block corresponding to one of the mask units.

The method may further comprise the step of doping the silicon wafer to render it non-transparent. Doping of the silicon generates free carrier absorption of incident light to render the silicon wafer substantially non-transparent.

Advantageously, the method may further comprise the step of applying an alignment device to each of the mask units.

In practice, the mask is typically secured in a fixed position between the optical fibre and to the integrated waveguide component and becomes an integral part of the optical assembly. Alternatively, a removable mask may be employed. In this case, the mask would be removed after the optical fibre had been aligned with the integrated waveguide and would not therefore form an integral part of the optical assembly This may potentially result in an attendant reduction in the signal to noise ratio of the final optical assembly/optical coupling.

BRIEF DESCRIPTION OF THE DRAWINGS

The present invention will now be described, by way of example only, with reference to the accompanying drawings in which.

DETAILED DESCRIPTION OF THE PREFERRED EMBODIMENTS

Figure 1:
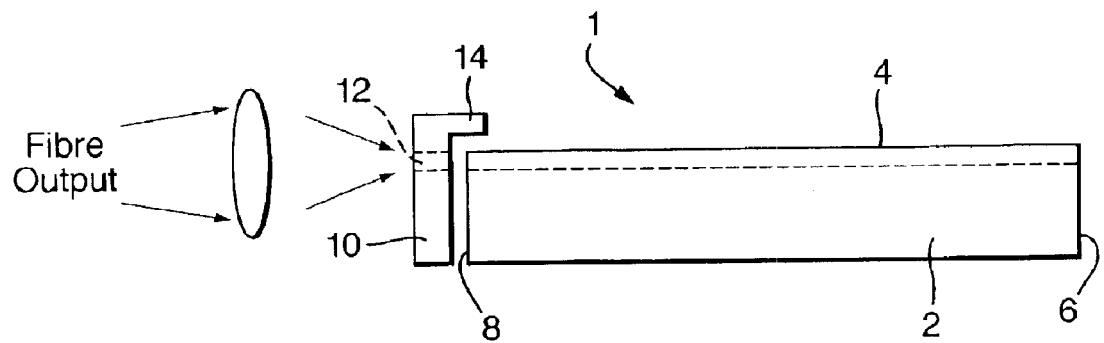
FIG. 1 illustrates diagrammatically a preferred form of apparatus according to the invention.

Referring to FIG. 1, there is illustrated diagrammatically a preferred form of apparatus for facilitating the alignment of an optical element, such as a optical fibre, to a further optical element such as an optical integrated waveguide component (IWC) denoted generally by reference numeral 1.

As shown in FIG. 1, the IWC 1 comprises an optically transparent substrate 2 which, in this embodiment, is formed of Gallium Arsenide (GaAs). The substrate 2 includes an upper region 4, extending along the length of the substrate, which has a higher refractive index than the remainder of the substrate and forms the waveguide itself.

As stated above, it is desired to align an optical fibre (not shown) to the waveguide 4 formed in the waveguide substrate 2 quickly and accurately. A detector (not shown) is disposed adjacent an output facet 6 of the IWC 1 (i.e. at the end of the IWC distal to the optical fibre) and is arranged to detect a mode signal from the waveguide 4. The mode signal is generated when the optical fibre is sufficiently aligned with the waveguide to excite the waveguide mode.

A mask, in the form of a block 10, is disposed between the optical fibre and the IWC 1 and is arranged to allow light from the optical fibre to pass into, and be transmitted through, the waveguide 4 but to substantially prevent light from being coupled into or transmitted through the substrate 2.

The mask comprises a block of silicon formed from a conventional silicon wafer. The block 10 is sized to have a cross-sectional area A which is equal to or greater than the area of the input facet 8 of the IWC 1 such that it substantially masks the input facet of the IWC.

The block 10 includes an aperture 12 extending from a front face of the block 10 to a rear face thereof and thus defines an optical transmission pass through the block 10. The aperture 12 is disposed in the block 10 such that, when the latter is placed adjacent to the input facet 8 of the IWC 1, the aperture 12 is substantially exactly aligned with the waveguide 4.

The block 10 is fabricated as follows: a conventional silicon wafer is patterned photolithographically and etched to define a plurality of mask "units", each mask unit having a cross-sectional area equal to or greater than that of the end facet of the IWC 1. The aperture 12 is then dry-etched into each of the mask units defined on the silicon wafer, the latter then being diced or cut into the individual mask blocks 10, each block corresponding to a mask unit.

The aperture 12 is etched such that it passes fully through each individual block 10, thereby to define an optical transmission path through the block. However, preferably the cross-sectional area of the aperture 12 is not constant through the thickness of the block and tapers from the front surface of the block to the rear surface. In one embodiment, the aperture 12 has a cross-sectional area at the front surface of the block 10 of approximately 25 $\mu m^2$ and a cross-sectional area at the rear surface of the block 10 of 15 $\mu m^2$. Preferably, the cross-sectional area of the aperture 12 at the rear surface of the block 10 is substantially equal to the cross-sectional area of the waveguide at its front facet. These dimensions are particularly applicable to wafer thicknesses of approximately 380 $\mu m$, but it will be appreciated that the aperture 12 may be etched to have substantially any cross-sectional area, according to requirements.

Generally, the aspect ratio of the cross-sectional area of the aperture at a front surface of the block 10 and the cross-sectional area at a rear surface may be approximately 1.7:1. The aspect ratio will vary depending on the thickness of the block 10 and the process used to create the aperture 12. Typical waveguide dimensions are between 5 $\mu m$ and 10 $\mu m$ so an aperture tapered to this at the rear face of the block 10 is desirable.

The silicon material is also preferably doped to generate free carrier absorption of incident light, thereby substantially preventing light transmission through the block 10 other than by means of the aperture 12. The silicon block is thus substantially non-transparent to incident light from the optical fibre, other than through the aperture.

The block 10 is placed adjacent and in front of the input facet of the IWC 1 such that the aperture 12 is substantially exactly aligned with the waveguide 4. This may be achieved in a number of ways: a first method is to manually abut the block 10 to the input facet 8 of the IWC 1 and adhere the block 10 thereto using an epoxy adhesive or other suitable means.

Figure 3:
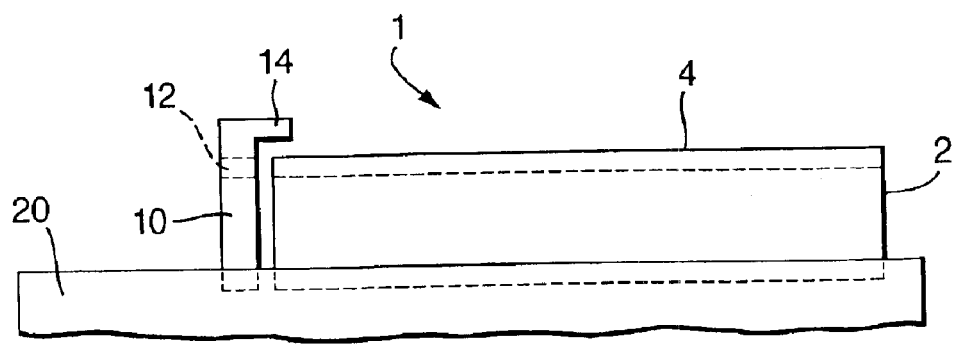
FIG. 3 is a side elevation of a modification to the apparatus of FIG. 1.

A second method is illustrated in FIG. 3 and involves mounting the IWC 1 and the block 10 on a silicon motherboard 20 by means of slots etched in the motherboard 20 and corresponding projections on the block 10 and IWC 1.

With the block 10 appropriately positioned adjacent the input facet 8 of the IWC 1, the substrate 2 of the IWC 1 is effectively masked such that light from an optical element such as an optical fibre (not shown) is unable to pass therethrough. Only light signals passing through the aperture 12 are transmitted through the IWC 1 and these signals are transmitted substantially entirely by means of the waveguide 4. Consequently, only light transmitted through the waveguide itself will be detected by the detector and, thus, interference to the detector is minimised.

With the block 10 in place in front of the input facet 8 of the IWC 1, the optical fibre can be aligned manually with the aperture, the correct position for the optical fibre being determined when the waveguide 4 is excited and the detector detects the optimised mode signal of the waveguide.

It will be appreciated that the present invention allows the alignment of an optical fibre with an optical IWC simply and considerably more rapidly than with existing methods. However, an improvement to the above-described apparatus allows a significant degree of automation to be incorporated in the alignment process. In this embodiment, an alignment device, such as described below, is incorporated in the apparatus. Such an alignment device enables an appropriate manipulating mechanism, such as an actuator, a robotic arm or the like for manipulating the optical fibre, to establish the position of the optical fibre relative to the aperture 12 in the block 10. By using a feedback control mechanism such as, for example, a closed-loop algorithmic system, the manipulating mechanism is able to manipulate the optical fibre to align it with the aperture 12 in dependence on the position of the optical fibre.

Figure 2:
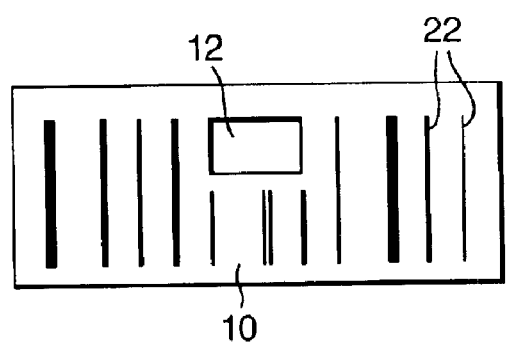
FIG. 2 is a front elevation of the apparatus of FIG. 1.

The alignment device may advantageously be provided in one of the following ways. At the time of patterning the silicon wafer, a series of reflective metal tracks, bars or strips 22 is defined on the front face of the block in the manner of a barcode (FIG. 2). Light emitted by the optical fibre is reflected by the bars 22 in the barcode and received by an optical detector associated with the fibre manipulating mechanism. By forming each bar in the barcode to have a predetermined width and spacing from an adjacent bar, it is possible for a signal processor (not shown) coupled to the optical detector to determine the position of the optical fibre relative to the aperture 12, in dependence on the patterns of light reflected by the barcode.

The manipulating mechanism is then able to manipulate the optical fibre to adjust its position both vertically and horizontally relative to the block 10 until the optical fibre is substantially exactly aligned with the aperture 12. It will be appreciated that a closed-loop control system is thus defined which enables the manipulating mechanism to determine the position of the optical fibre relative to the block and "home in" on the aperture 12.

In a similar method (not shown) a single reflective line extending across the front face of the block 10 from a point on the periphery of the face to the aperture 12 may be provided. Again, the light from the optical fibre is reflected to the optical detector which causes the manipulating mechanism to "follow" the line, thereby to align the optical fibre with the aperture 12. The method by which the manipulating mechanism is able to follow the reflective line is well known in the art of robotics.

In a further alternative embodiment (not shown), the front face of the block 10 is provided with a two-dimensional array of photodetectors, each of which is arranged to generate a respective positional signal when light from the optical fibre is incident upon them. The signals generated by the photodetectors are supplied to a signal processor associated with the manipulating mechanism, which determines therefrom the position of the optical fibre relative to the block. Again, a closed-loop feedback control system is provided to enable the manipulating mechanism to "home in" on the aperture 12 in response to the photodetector output signals.

The silicon micro-aperture block can be used to align optical fibres to both the input and output facets 8, 6 of the IWC 1 and can be used with a variety of waveguide materials, with or without the use of a silicon motherboard or patterned barcode or photodetector array. The motherboard and barcode/detector array serve to enhance the methodology and allow a considerable degree of automation to be incorporated in the alignment process.

It will be appreciated that the block 10 need not be formed from silicon or, indeed, from a semiconductor material. The use of semiconductor materials, and particularly silicon, is preferred since the etching process for such materials is well established and it enables photodetector arrays, such as that described above, to be incorporated.

As shown in FIGS. 1 and 3, the block 10 can be formed to have a lip or projection 14 which serves to locate the block correctly relative to the IWC 1 and provides the additional advantage that light from the optical fibre cannot be transmitted to the detector through the air surrounding the IWC.

While there have been shown and described several embodiments of the present invention, it should be understood by those skilled in the art that various changes and modifications may be made therein without departing from the spirit and scope of the invention as claimed.

What is claimed is:

1. An apparatus for facilitating the alignment of an optical fibre, said optical fibre adapted to convey a beam of light there-within, to an integrated waveguide component comprising a substrate having an integral waveguide, the apparatus comprising:
   a mask arranged to be disposed between the optical fibre core and the integrated waveguide component, the mask comprising a body defining an aperture extending therethrough;
   wherein the body of the mask is substantially non-transmissive and non-reflective of light incident thereon from the optical fibre and wherein, in use, the aperture is substantially exactly aligned with the waveguide, thereby to permit light from the optical fibre to be transmitted through said aperture to the waveguide but to substantially prevent light from the optical fibre from passing around the waveguide and/or through the substrate.

2. An apparatus as claimed in claim 1, wherein the mask has a cross-sectional area greater than or equal to the cross-sectional area of the integrated waveguide component.

3. An apparatus as claimed in claim 1, wherein the aperture is sized to correspond substantially to the cross-sectional area of the waveguide.

4. An apparatus as claimed in claim 2, wherein the aperture is sized to correspond substantially to the cross-sectional area of the waveguide.

5. An apparatus as claimed in claim 1, wherein the aperture tapers such that the cross-sectional area thereof reduces from a front surface of the mask to a rear surface thereof, and wherein the cross-sectional area of the aperture at the rear surface is substantially equal to the cross-sectional area of the waveguide.

6. An apparatus as claimed in claim 5, wherein the ratio of the cross-sectional area of the aperture at a front surface of the mask and the cross-sectional area of the aperture at a rear surface of the mask is approximately 1.7:1.

7. An apparatus as claimed in claim 1, wherein the mask comprises a block of a semi-conductor material.

8. An apparatus as claimed in claim 7, wherein the semiconductor material is silicon.

9. An apparatus as claimed in claim 8, wherein the mask is formed from a silicon wafer.

10. An apparatus as claimed in claim 8, wherein the silicon is doped, thereby to absorb light from the optical fibre.

11. An apparatus as claimed in claim 1, further including an alignment device for further facilitating alignment of the optical fibre with the aperture.

12. An apparatus as claimed in claim 11, wherein the alignment device comprises a plurality of reflective strips disposed on the front surface of the mask substantially in the form of a barcode for reflecting light from the optical fibre.

13. An apparatus as claimed in claim 12 further comprising a detector for detecting light reflected by one or more of the reflective strips and generating a first signal in response thereto.

14. An apparatus as claimed in claim 13, further comprising a processor for receiving the first signal, determining the position of the optical fibre relative to the aperture and generating a control signal in dependence thereon.

15. An apparatus as claimed in claim 14, further comprising an actuator for manipulating the optical fibre in dependence on the control signal, thereby to align the optical fibre with the aperture.

16. An apparatus as claimed in claim 11 wherein the alignment device comprises a plurality of detector elements disposed on a front surface of the mask, each detector element being arranged to detect light from the optical fibre and generate a signal in dependence upon the amount of light detected.

17. An apparatus as claimed in claim 16, further comprising a processor for receiving the signal generated by each detector element, determining the position of the optical fibre relative to the aperture from said signals and generating a control signal in response thereto.

18. An apparatus as claimed in claim 17, further comprising an actuator for manipulating the optical fibre in dependence on the control signal, thereby to align the optical fibre with the aperture.

19. A method of aligning an optical fibre to an integrated waveguide component comprising a substrate having an integral waveguide, the method comprising:
   (a) positioning a mask adjacent an input facet of the integrated waveguide component, the mask comprising a body having an aperture extending therethrough, wherein the body of the mask is substantially non-transmissive and non-reflective of light incident thereon from the optical fibre,
   (b) aligning the aperture substantially exactly with the waveguide in the integrated waveguide component, (c) manipulating the optical fibre so that light transmitted therefrom is incident upon the mask, (d) detecting light emitted from an output facet of the integrated waveguide component, (e) further manipulating the optical fibre until it attains a desired position, whereby a waveguide mode signal is detected at the output facet of the integrated waveguide component, and (f) fixing or securing the optical fibre relative to the integrated waveguide component in said desired position.

20. A method as claimed in claim 19, comprising the steps of:

providing the mask with a plurality of reflective tracks, detecting light reflected by the reflective tracks and generating a first signal in response thereto, determining the position of the optical fibre relative to the aperture and generating a control signal in dependence thereon, and manipulating the optical fibre in dependence on the control signal, thereby to align the optical fibre with the aperture.

21. An optical arrangement comprising an integrated waveguide component, an optical fibre secured in a fixed position relative to the integrated waveguide component, and a mask comprising a body having an aperture extending therethrough, the mask being disposed between the integrated waveguide component and the optical fibre core, wherein the body of the mask is substantially non-transmissive and non-reflective of light incident thereon from the optical fibre, and wherein the aperture is substantially exactly aligned with the waveguide, thereby to permit light from the optical fibre to be transmitted through the aperture to the waveguide but to substantially prevent light from the optical fibre from passing around at least one of the waveguide and the substrate, or through the substrate.

* * * * *